United States Patent
Fong et al.

(10) Patent No.: US 11,577,193 B2
(45) Date of Patent: Feb. 14, 2023

(54) HEAT-DRIVEN ADSORPTION VACUUM DEHUMIDIFICATION SYSTEM

(71) Applicant: City University of Hong Kong, Hong Kong (HK)

(72) Inventors: Kwong Fai Fong, Hong Kong (HK); Chun Kwong Lee, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 36 days.

(21) Appl. No.: 17/458,601

(22) Filed: Aug. 27, 2021

(65) Prior Publication Data

US 2022/0062819 A1    Mar. 3, 2022

Related U.S. Application Data

(60) Provisional application No. 63/071,514, filed on Aug. 28, 2020.

(51) Int. Cl.
    *B01D 53/26*    (2006.01)
    *B01D 53/04*    (2006.01)
    *F24F 3/14*     (2006.01)

(52) U.S. Cl.
    CPC ....... *B01D 53/268* (2013.01); *B01D 53/0438* (2013.01); *B01D 53/261* (2013.01);
    (Continued)

(58) Field of Classification Search
    CPC .............. B01D 53/268; B01D 53/261; B01D 53/0438; F24F 3/1411
    See application file for complete search history.

(56) References Cited

U.S. PATENT DOCUMENTS 7,497,089 B2    3/2009  Kakiuchi et al.
2020/0088423 A1*  3/2020  Scovazzo ............... B01D 53/26

FOREIGN PATENT DOCUMENTS

CN    101906800 A    12/2010
CN    103282724 A    9/2013
(Continued)

OTHER PUBLICATIONS

Zohreh Rahimi-Ahar et al., Comprehensive study on vacuum humidification-dehumidification (VHDH) desalination, Applied Thermal Engineering 169 (2020), Article No. 114944.
(Continued)

*Primary Examiner* — Sharon Pregler
(74) *Attorney, Agent, or Firm* — Idea Intellectual Limited; Margaret A. Burke; Sam T. Yip

(57) ABSTRACT

The present invention provides a heat-driven adsorption vacuum dehumidification system including a vapor adsorption apparatus having a water permeable hydrophilic membrane separating the apparatus into at least a feed section and a low-pressure or vacuum section (evaporator), and providing a water vapor pressure difference to extract moisture from the air flowing through the apparatus into the evaporator, followed by adsorption in an adsorption chamber, and subsequently desorbed when acted as a desorption chamber to form water vapor which is condensed in a condenser. Adsorption and desorption chambers inter-change periodically to form a complete system cycle. Heating of chamber/compartment can be from waste heat or a renewable source in the absence of any electricity supplied externally. Related method for using a heat-driven adsorption vacuum dehumidification system to remove moisture from the air is also provided. The present invention is superior to the adsorption chiller over a wide range of operating conditions.

18 Claims, 8 Drawing Sheets

(52) U.S. Cl.
CPC .......... *B01D 53/265* (2013.01); *F24F 3/1411* (2013.01); *B01D 2253/106* (2013.01); *B01D 2257/80* (2013.01); *B01D 2259/402* (2013.01); *B01D 2259/40088* (2013.01); *F24F 2003/144* (2013.01)

(56) References Cited

FOREIGN PATENT DOCUMENTS

| | | |
|---|---|---|
| CN | 107036192 A | 8/2017 |
| CN | 109262778 A | 1/2019 |
| JP | S63220026 A | 9/1988 |
| JP | H0282034 A | 3/1990 |
| WO | 2019062443 A1 | 4/2019 |

OTHER PUBLICATIONS

Hyunjeong Lim et al., Performance simulation of membrane heat pumps based on vacuum membrane dehumidification system, Journal of Mechanical Science and Technology 34 (2) 2020, p. 941-948.
Jungchul Kim et al., Analytic approach to analyzing the performance of membrane dehumidification by pervaporation, Journal of Mechanical Science and Technology 33 (6) (2019), p. 2979-2984.
Paul Scovazzo et al., Membrane module design, construction, and testing for vacuum sweep dehumidification (VSD): Part I, prototype development and module design, Journal of Membrane Science 576 (2019), p. 96-107.
Ahmad A. Bukshaisha et al., Simulation of membrane heat pump system performance for space cooling, International Journal of Refrigeration 99 (2019) p. 371-381.
Ming Qua et al., Isothermal membrane-based air dehumidification: A comprehensive review, Renewable and Sustainable Energy Reviews 82 (2018) p. 4060-4069.
T.D. Bui et al., On the theoretical and experimental energy efficiency analyses of a vacuumbased dehumidification membrane, Journal of Membrane Science 539 (2017) p. 76-87.
Duc Thuan Bui et al., A thermodynamic perspective to study energy performance of vacuum-based membrane dehumidification, Energy 132 (2017) p. 106-115.
Paul Scovazzo et al., Isothermal dehumidification or gas drying using vacuum sweep dehumidification, Applied Thermal Engineering 50 (2013) p. 225-233.
Xiaolin Wang et al.,Two bed silica gelewater adsorption chillers: An effectual lumped parameter model, International Journal of Refrigeration 30 (2007) p. 1417-1426.
Ka Chung Chan et al.,Experiment verified simulation study of the operating sequences on the performance of adsorption cooling system, Building Simulation (2015) vol. 8, No. 3, p. 255-269.
Akiyoshi Sakoda et al.,Fundamental Study on Solar Powered Adsorption Cooling System, Journal of Chemical Engineering of Japan, 1984, vol. 17, No. 1, p. 52-57.

\* cited by examiner

HEAT-DRIVEN ADSORPTION VACUUM DEHUMIDIFICATION SYSTEM

CROSS-REFERENCE WITH RELATED APPLICATIONS

The present application claims priority from the U.S. Provisional Patent Application No. 63/071,514 filed Aug. 28, 2020, and the disclosure of which is incorporated herein by reference in its entirety.

FIELD OF THE INVENTION

The present invention relates to a dehumidifier system. In particular, the present invention relates to a heat-driven vacuum dehumidifier system incorporating a vapor adsorption apparatus to enable dehumidification in the absence of electricity-driven vacuum pump but rather driven by heat from an external source to create a water vapor pressure difference between an interior space and the process air stream.

BACKGROUND

Air-conditioning systems are used to be a major electricity consumer and carbon footprint in a modern city. With the demand for a better air ventilation in indoor environment, especially under the Covid-19 pandemic, more efforts have been made to attempt to meet the increasing energy demand by better indoor air-conditioning systems whilst reducing carbon emission from these systems.

Thermal cooling systems driven by solar energy or waste heat from a co-/tri-generation system are considered to reduce carbon emission, in particular, in modern cities of tropical/sub-tropical areas where energy demand from air-conditioning systems contribute to the majority of the total energy consumption.

Common thermal cooling systems include absorption chiller (AbC), adsorption chiller (AdC) and desiccant cooling system. In a recent study, Fong et al. (2010) compared different solar cooling systems in Hong Kong and remarked that AbC has a better coefficient of performance (COP) and therefore has a higher potential in a variety of applications in terms of its primary energy saving. However, compared to AdC, life cycle of AbC as well as that of liquid desiccant cooling systems are short and costly in maintenance; solid desiccant cooling system is usually bulkier and lower in energy efficiency as it adds heat to air stream during dehumidification. Hence, many recent studies focused on AdC, especially looking for new adsorbent.

For example, JP475122B1 disclosed a dehumidifier including a hygroscopic filter having hydrophilic inorganic materials such as zeolite, silica gels, etc., to absorb moisture in air, and the absorbed water is recovered by a means using heat to become water vapor.

U.S. Pat. No. 6,442,951B1 disclosed a dehumidifier including a moisture absorber having a desiccant for absorbing moisture from the process air. However, it also involves the use of refrigerant during the vapor compression process which is an environmental unfriendly process.

U.S. Ser. No. 10/486,102B2 disclosed a moisture removal/water harvesting material including hydrophilic micropores-containing material and a low water activity material, where the hydrophilic material can be a superhydrophilic material.

CN106705334A disclosed a fresh air handling system including an energy storage of a phase change material to store heat generated by thermoelectric cooler for regeneration of the adsorbent.

However, none of the foregoing references provide an integrated system that is absent in any environmental unfriendly refrigerant or coolant, or efficiently dehumidifies incoming air from the surroundings.

Conventional dehumidifiers are equipped with a compressor driven by electricity to dehumidify the process air by cooling and reheat the same through a vapor compression refrigerating cycle. Another emerging technology is vacuum dehumidifier which employs an electric vacuum pump to create a vacuum space to transfer moisture from process air outside the dehumidifier into the vacuum space inside the dehumidifier. Vacuum dehumidification (VD) is a mechanism of directly extracting water away from moist air stream passing through a selective medium along a water vapor pressure difference. Both are not environmental-friendly as they create a lot of carbon dioxide emission and noise.

FIG. 1 shows a design of a conventional vacuum dehumidifier, in which moist air is fed into a feed side of a hydrophilic membrane. From the feed side of the hydrophilic membrane, water vapor or permeate is transferred to permeate side of the membrane due to the water vapor pressure difference between two sides of the membrane. A vacuum pump is used to extract the water vapor from the permeate side of the membrane to the ambient while the dry air after VD leaves the feed side as a retentate. Unlike solid desiccant cooling system, VD illustrated in FIG. 1 is an isothermal dehumidification process. Energy performance of VD is better than other conventional dehumidification methods described hereinabove. Air-conditioning system incorporating VD is also considered to have a better overall energy performance by coupling with a radiant cooling system, thus reducing carbon emission.

For example, the following references which are incorporated herein by reference in their entirety provided VD driven by electrical vacuum pump:
US2020088423A1
WO2019062443A1
CN109262778A
CN107036192A
CN103282724A
CN101906800A
JPH0282034A
JPS63220026A In addition, Qu et al. (2018) reviewed research works on membrane dehumidification including VD; Rahimi-Ahar et al. (2020) proposed VD applied in seawater desalination system; Lim et al. (2020) proposed an alternative vacuum dehumidification system to enhance energy performance and technical feasibility; Scovazzo and MacNeill (2019) provided a vacuum sweep dehumidification system developed based on a previous work (Scovazzo and Scovazzo, 2013), in which membrane tubes were employed to install across the feed flow direction with permeate being sucked into the interior of the membrane tubes for delivery to the ambient through a vacuum pump; Bukshaisha and Fronk (2019) proposed a membrane-based heat pump system using VD, vacuum evaporative cooling and pressurized humidification, in which they remarked that there was energy saving when outdoor temperature was over 21.67° C. under a wide range of weather conditions; Bui et al. (2017a) studied the thermodynamic aspect to show the performance of a VD system and proposed some new configurations to improve its COP significantly; another study by Bui et al.

(2017b) proposed a model to determine performance of a VD system and also a prototype to test the system including a membrane made by themselves.

Among those VD systems equipped with electric vacuum pumps, their COP are not much better than that of AdC in a small- to medium-sized application due to their lower electrical efficiencies in such circumstance.

Therefore, there is a need for an improved heat-driven vacuum dehumidifier which utilizes thermal energy to drive the vapor adsorption cycle in order to achieve reduction in carbon dioxide emission while COP is at least comparable to that of electrical VD systems.

SUMMARY OF THE INVENTION

Accordingly, a first aspect of the present invention provides a heat-driven adsorption vacuum dehumidification (AdVD) system including:

a vapor adsorption apparatus which includes a water permeable hydrophilic membrane separating the apparatus into at least two sections including a feed section and a low-pressure or vacuum section (evaporator), where the feed section is disposed at where process air flows through the apparatus and has a maximum contact surface area with the water permeable hydrophilic membrane; the evaporator is disposed distal to where the process air flows through the vapor adsorption apparatus and has relatively lower water vapor pressure than that of the process air in the feed section such that a water vapor pressure difference is established across the water permeable hydrophilic membrane;

a two-bed adsorption-desorption section which includes at least an adsorption chamber and a desorption chamber, where the adsorption chamber communicates with the evaporator and a cooling agent source, the desorption chamber communicates with the condenser and a heating agent source, respectively; the cooling agent helps keep the water vapor pressure of the adsorbent inside the adsorption chamber below that of the vacuum section so that moisture is extracted by the evaporator from the process air passing through the water permeable hydrophilic membrane to the adsorption chamber; the heating agent source helps keep the water vapor pressure of the adsorbent inside the desorption chamber above that of the condenser so that moisture is expelled from the desorption chamber to the condenser;

a condenser which communicates with the desorption chamber and a cooling source, respectively, and has been supplied with a cooling liquid to convert the water vapor migrated from the desorption chamber into a condensed water;

wherein the air after flowing through the vapor adsorption apparatus is substantially dry and the system is substantially free from electricity to establish and maintain the relatively lower water vapor pressure in the evaporator.

Optionally, the present system further includes an auxiliary cooling provision through the evaporator and a chilled liquid source by communicating with the condenser.

In a preferred embodiment, the hot water supplied to the desorption chamber or compartment can be heated by a renewable source, e.g., solar energy (a solar energy converter will thereby be provided). By the afore-mentioned configuration, the present system can operate in the absence of any electrical vacuum pump to dehumidify the process air while COP of the present system is comparable or even higher than that of conventional VD using electrical vacuum pump to extract water vapor from the process air in small- to medium-capacity applications.

In accordance with an embodiment, the adsorbent can be a chemical adsorbent selected from silica gel, activated carbon, zeolite, metal-organic framework (MOF) or any material which surface allows water to be adsorbed or desorbed.

In accordance with an embodiment, the water permeable hydrophilic membrane has a pore size which only allows water vapor to pass therethrough.

In accordance with an embodiment, the low-pressure or vacuum section (evaporator) of the present system is usually below 2 kPa.

In accordance with an embodiment, the temperature of water supplied to the adsorption chamber or compartment is usually above 60 degrees Celsius.

In accordance with an embodiment, the temperature of water supplied to the desorption chamber or compartment is below 35 degrees Celsius.

In accordance with an embodiment, the cooling agent source supplying a cooling water to any section, chamber and/or compartment of the present system can be from a cooling water circulation collected from a cooling tower or nearby fresh water source.

In accordance with an embodiment, the hot source can be heated up by solar energy or waste heat.

Accordingly, another aspect of the present invention provides a method for using a heat-driven adsorption vacuum dehumidification system to remove moisture from process air, where the method includes:

providing a water vapor pressure difference sufficient to extract moisture from the process air passing through a vapor adsorption apparatus incorporated with a water permeable hydrophilic membrane specific for water molecules to pass through from a feed side to a low-pressure or vacuum side of the vapor adsorption apparatus in the absence of any electricity;

cooling by a cooling source an adsorption chamber or compartment communicating with the low-pressure or vacuum section (evaporator) of the vapor adsorption apparatus such that the moisture extracted from the feed side through the water permeable hydrophilic membrane into the low-pressure or vacuum section (evaporator) is adsorbed on the surface of an adsorbent having been cooled to below a temperature when the water vapor pressure of the adsorbent is lower than that at the vacuum section;

heating by a hot source a desorption chamber or compartment communicating with the condenser to reach a temperature that is sufficient to desorb the water on the surface of the adsorbent from the desorption chamber or compartment into the condenser;

cooling by a cooling source a condenser communicating with the desorption chamber or compartment to a temperature that is sufficient to condense the water vapor migrated from the desorption chamber or compartment into the condenser, wherein the hot source can be selected from any renewable energy source or waste source such that the system can significantly reduce carbon emission.

Any embodiments of the first aspect of the present invention can also be applicable to the present method, or any reasonable variations/modifications by a person of ordinary skill in the art to implement the present method without departing from the spirit and objectives thereof are also applicable.

BRIEF DESCRIPTION OF THE DRAWINGS

Embodiments of the invention are described in more details hereinafter with reference to the drawings, in which.

DETAILED DESCRIPTION OF THE INVENTION

In the following description, systems, devices, methods of dehumidifying process air, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It should be apparent to practitioner skilled in the art that the foregoing and subsequent examples of the system and method are only for the purposes of illustration of working principle of the present invention. It is not intended to be exhaustive or to limit the invention to the precise forms disclosed.

Figure 1:
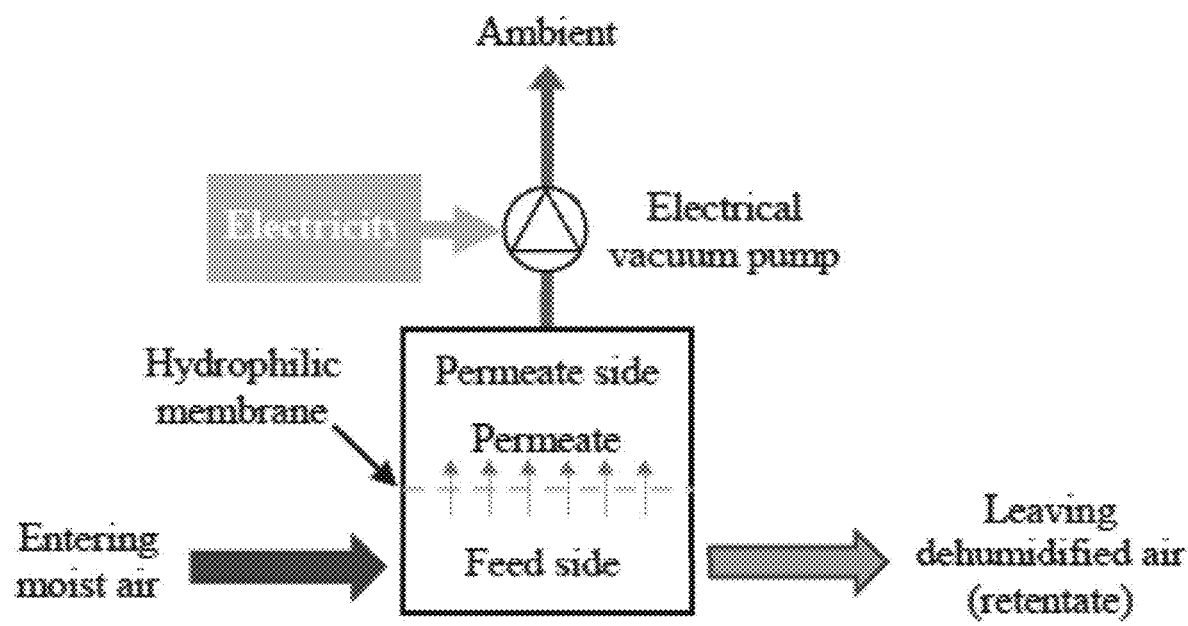
FIG. 1 schematically depicts a conventional vacuum dehumidification method.
Figure 2:
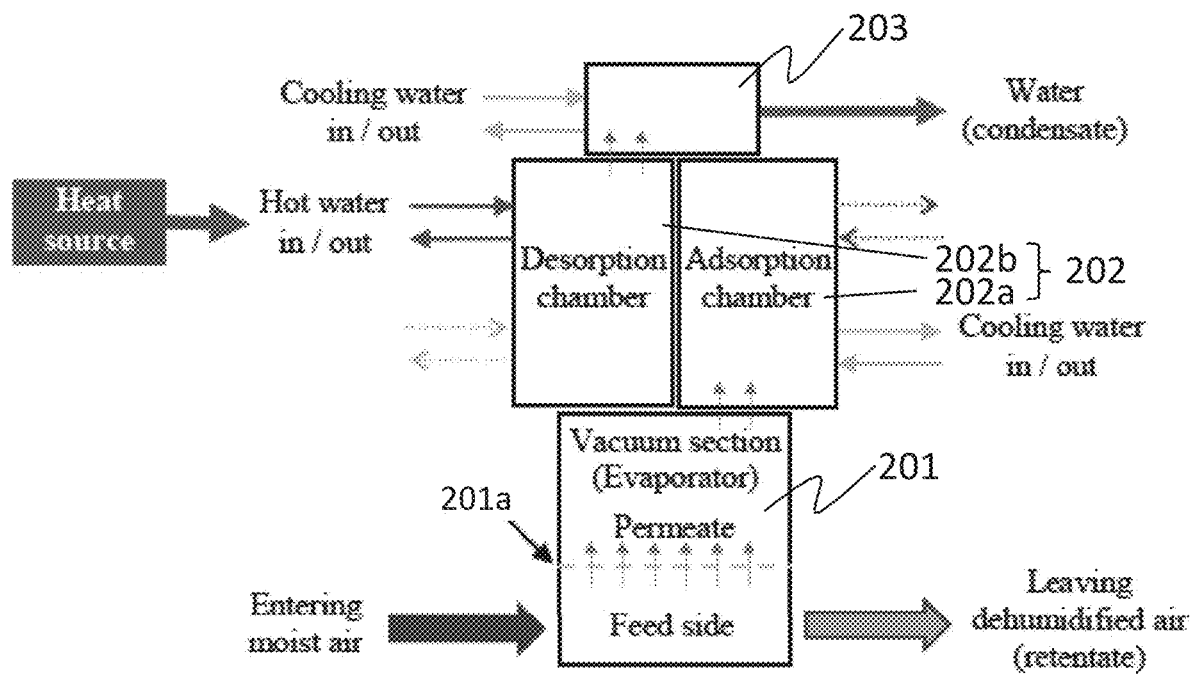
FIG. 2 schematically depicts an adsorption vacuum dehumidification system according to an embodiment of the present invention.

Turning to FIG. 2, a preferred embodiment of the present system includes a vapor adsorption apparatus (201) having at least a feed side, a low-pressure or vacuum side, and between the feed side and the low-pressure/vacuum side is separated by a water permeable hydrophilic membrane (201a). It is defined that the water vapor pressure on the feed side is higher than that on the low-pressure or vacuum side of the apparatus to establish a water vapor pressure difference across the water permeable hydrophilic membrane (201a). To establish the water vapor pressure difference, the vapor adsorption apparatus (201) communicates with an adsorption chamber (202a) of a two-bed adsorption-desorption section (202) of the system where the adsorption chamber (202a) incorporates an adsorbent, a relatively cool water supply, and a heat exchange to direct the heat absorbed by the adsorbent away from the adsorption chamber (202a). In one embodiment, the adsorbent is selected from silica gel.

The cool water supply helps keep the water vapor pressure of the adsorbent inside the adsorption chamber (202a) sufficiently low so that the migrated water vapor can adsorb on the surface of the adsorbent.

With the heat from a heat source through a water circulation communicating with the desorption chamber (202b), the vapor pressure of the adsorbent inside the desorption chamber (202b) is increased to a sufficiently high level in which the water vapor desorbs from the surface of the adsorbent, and the water vapor is transferred to a condenser (203) which communicates with a cooling water supply such that water vapor from the desorption chamber (202b) is converted into condensate which is water.

Should auxiliary cooling be required, part of the condensate from the condenser is transferred to the evaporator through an expansion valve to cool a chilled liquid source running through the evaporator.

The adsorption and desorption processes inside the adsorption (202a) and desorption (202b) chambers are transient, and the mass transfer rates will decrease with time. Consequently, the roles of the adsorption (202a) and desorption (202b) chambers inter-change periodically as well as the supply of cool and hot water in a complete system cycle. In other words, the system operates intermittently.

Because VD is an isothermal process, only mass transfer across the water permeable hydrophilic membrane (201a) is considered. The only heat transfer in the low-pressure or vacuum section is due to the water vapor migrated from the process air and subsequently extracted to the adsorption chamber.

The heat power input 6 ($\dot{Q}_{heat}$) and the cooling load ($\dot{Q}_{cool}$) of the system are given:

$$\dot{Q}_{heat}=\dot{m}_{hw}c_{p,w}(T_{hw,i}-T_{hwo}) \quad (1)$$

$$\dot{Q}_{cool}=\dot{m}_{da}(h_{ai}-h_{ao}) \quad (2)$$

The average cooling capacity over a complete dehumidification cycle and the overall system COP can be determined by equations (3) and (4), respectively:

$$CAP = \frac{\int_0^{t_{cycle}} \dot{Q}_{cool} dt}{t_{cycle}} \quad (3)$$

$$COP = \frac{\int_0^{t_{cycle}} \dot{Q}_{cool} dt}{\int_0^{t_{cycle}} \dot{Q}_{heat} dt} \quad (4)$$

To compare the performance of the present system with an existing AdC, design parameters from Chan et al. (2015) are taken as references for the adsorption cycle. Regarding the membrane, parameters from Bukshaisha and Fronk (2019) are adopted. The total membrane area is taken as 5 m$^2$.

To compare the performance between the AdC and the present system, a performance improvement index (PII) is determined by:

$$PII_{CAP} = \frac{CAP_{AdVD}}{CAP_{AdC}} - 1 \quad (5)$$

$$PII_{COP} = \frac{COP_{AdVD}}{COP_{AdC}} - 1 \quad (6)$$

Before comparison, according to Chan et al. (2015), a complete dehumidification cycle should include different combinations of operation modes, i.e., pre-heating/cooling (PHC), adsorption/desorption (AdDe), heat and mass recovery (HMR). A basic combination includes AdDe plus HMR; thus, a test cycle can be AdDe>>HMR>>AdDe>>HMR, or so forth. CAP and COP of AdC under different cooling/hot water temperatures supplied to the corresponding chamber/section can therefore be obtained from the test cycle sequence/combination. An AdC model validated based on these parameters and values can be used as a baseline to compare with the CAP and COP of the present system. For both AdC and the present system, feed rate of the air flow is set as 0.1 m³/s at an entry conditions of 33 degrees Celsius and 67% relative humidity.

Example 1—Comparison of Performances Between AdC and the Present System in Terms of Different Combination/Sequence of Operating Conditions Table 1 shows the effect of different combination/sequence of operational conditions on CAP and COP of AdC and the present system.

TABLE 1

| Cycle Sequence | AdC CAP/COP | Present Invention CAP / COP | $PII_{CAP}/PII_{COP}$ |
|---|---|---|---|
| AdDe | 0.593/0.205 | 1.016/0.317 | 0.713/0.546 |
| PHC + AdDe | 0.596/0.214 | 1.009/0.326 | 0.693/0.523 |
| AdDe + HMR | 0.612/0.269 | 1.105/0.425 | 0.806/0.580 |
| PHC + AdDe + HMR | 0.615/0.279 | 1.077/0.431 | 0.751/0.545 |

From Table 1, the overall CAP and COP of the present invention are better than those of AdC (at least about 69.3% and 52.3% enhancement in CAP and COP, respectively, over AdC). COP of the present invention is also comparable to that of conventional VD using electrical vacuum dehumidification such as that by Bui et al. (2017) with the inclusion of HMR mode. The present invention is also coil-free in the evaporation step and cooling step as compared to conventional chilled water-based air-conditioning system. Thus, the present invention is better in terms of energy performance, in particular, in primary energy consumption.

From Table 1, it is observed that the inclusion of HMR increased both $PII_{CAP}$ and $PII_{COP}$, suggesting that HMR mode could benefit the performance of the present invention. Regarding the use of PHC, although there was a small improvement in COP, CAP was actually decreased. Therefore, whether PHC can actually increase the performance of the present invention is not apparent from the results of Table 1. In the subsequent sensitivity test, cycle sequence of AdDE>>HMR will be used.

Example 2—Variations of COP and CAP Under Different Operating Conditions

Figure 3:
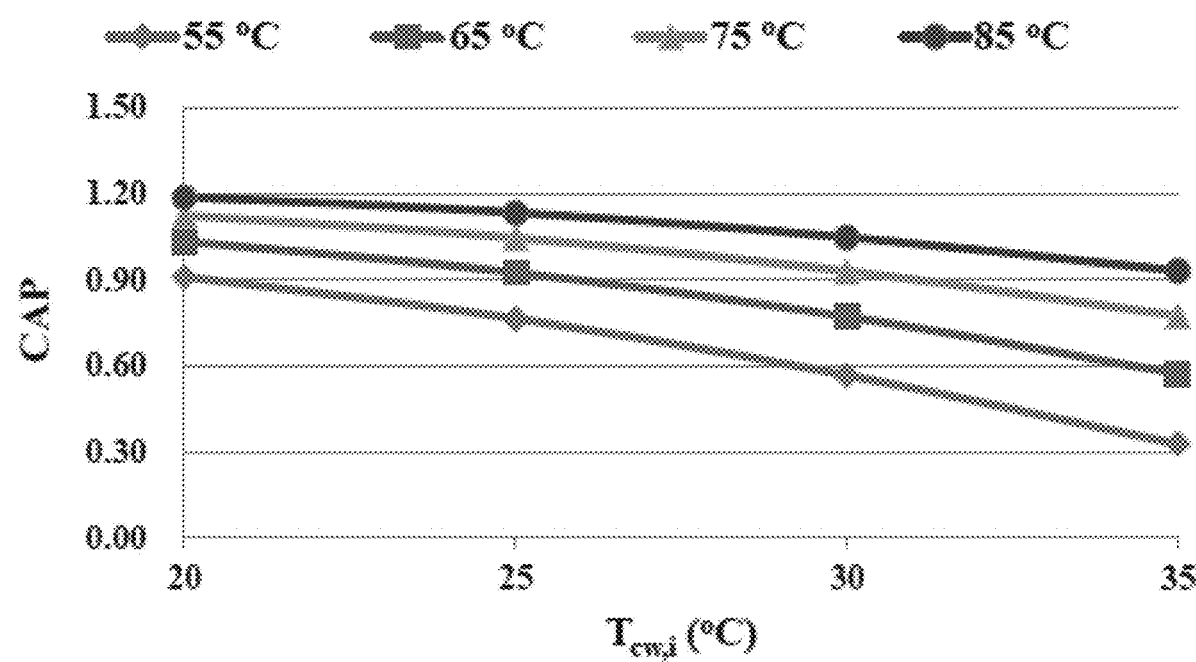
FIG. 3 shows the change in average cooling capacity (CAP) with the temperatures of cooling water under different temperatures of hot water supplied to the system according to an embodiment of the present invention.
Figure 4:
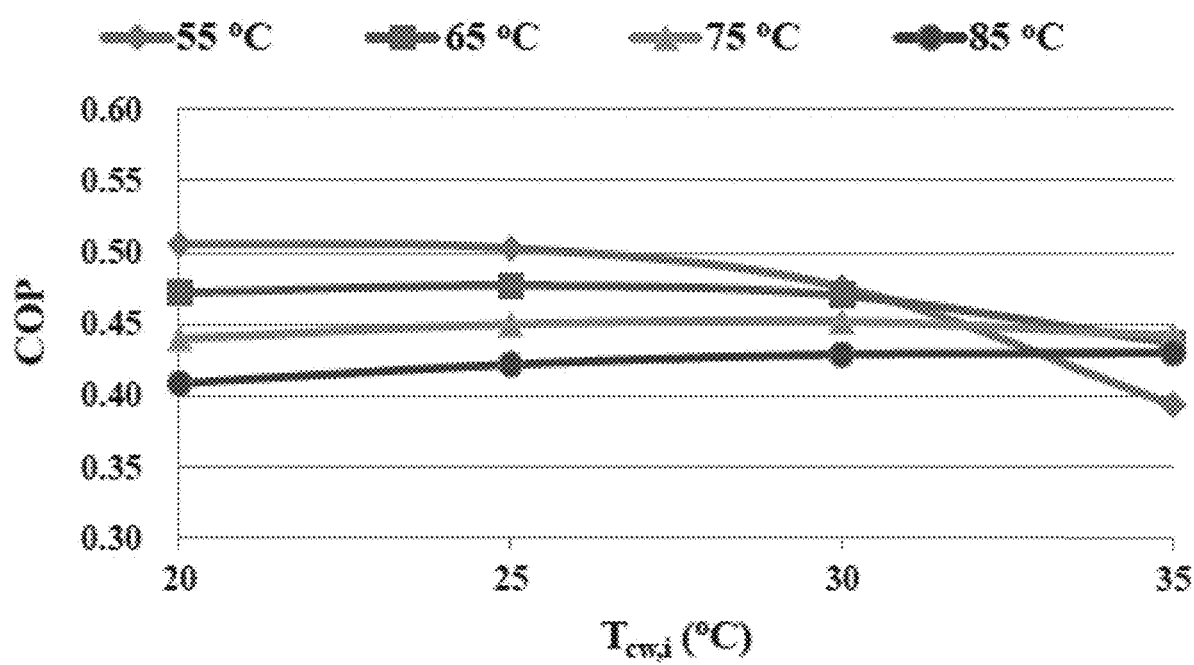
FIG. 4 shows the change in COP with the temperatures of cooling water under different temperatures of hot water supplied to the system according to an embodiment of the present invention.

FIGS. 3 and 4 show the variations of CAP and COP against different temperatures of the cooling water/hot water supplied to the adsorption/desorption chamber of the present invention. In FIG. 3, CAP of the present system was decreased with an increase in cooling water temperature or with a decrease in hot water temperature, which is similar to the trend in conventional AdC. However, it is observed that variation of COP of the present system at higher hot water temperature, e.g., at 85° C., resulted in an increasing trend against an increasing cooling water temperature, which is different from a comparative test result of AdC. The increasing trend was not obvious when the cooling water temperature was equal to or below 30° C. However, when the cooling water temperature was over 30° C., it is observed that the higher the hot water temperature, the more likely the COP is increased. This phenomenon was not observed in hot water temperatures below 85° C. It is even observed that hot water temperature equal to or below 65° C. resulted in a more rapid decrease in COP when the cooling water temperature is over 30° C. These observations are mainly due to an open circuit at the refrigerant side of the present system. That is, pressure at the condenser has no impact on the cooling capacity of the present system, but only the pressure in the low-pressure or vacuum section of the vapor adsorption apparatus accounts for these changes. Subsequent test for variation of thermal power input with different hot water temperatures when cooling water temperature is increased.

Example 3—Variation of Thermal Power Input Under Different Operating Conditions

Figure 5:
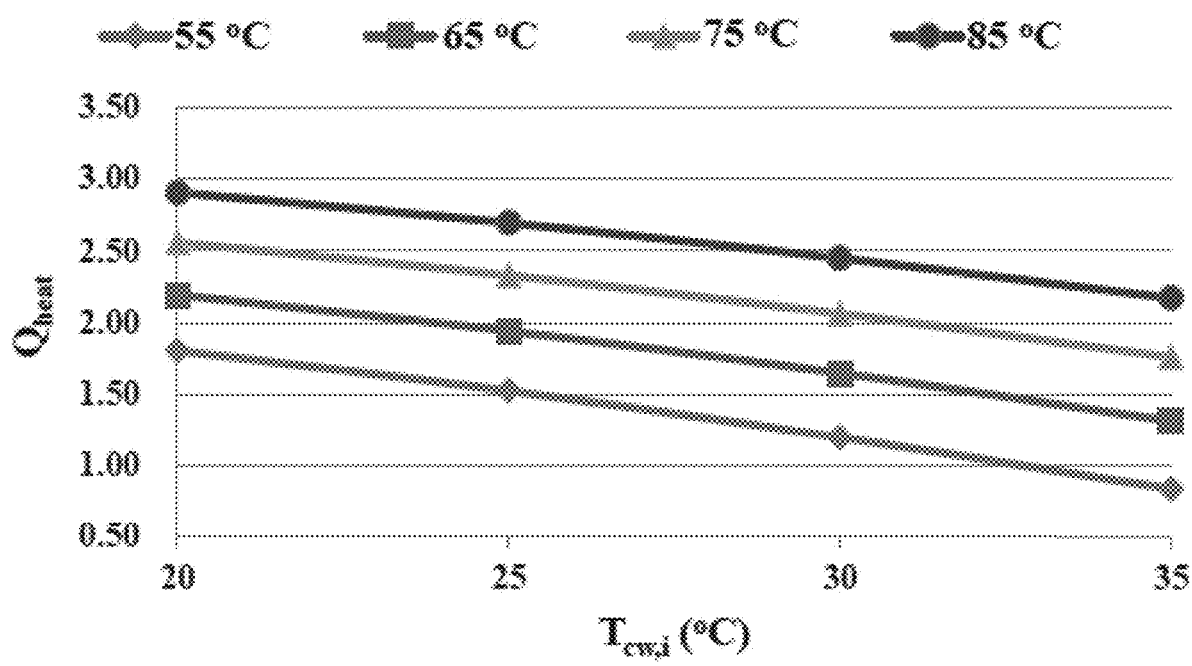
FIG. 5 shows the change in thermal power input ($Q_{heat}$) with the temperatures of cooling water under different temperatures of hot water supplied to the system according to an embodiment of the present invention.

FIG. 5 shows that $\dot{Q}_{heat}$ under different hot water temperatures decreases in a fairly constant rate when the cooling water temperature increases, the pattern of which are different from those in FIG. 3 (CAP was decreased more sharply when the hot water temperature was getting lower while the cooling temperature was increasing). From FIG. 4, COP was generally lower at higher hot water temperature and lower cooling water temperature, even though the resulting cooling capacity was higher. An optimal combination of the hot water temperature and cooling water temperature is likely to be determined according to a desirable compromise between CAP and COP of the present system.

Example 3—Variation of PII Under Different Operating Conditions

Figure 6:
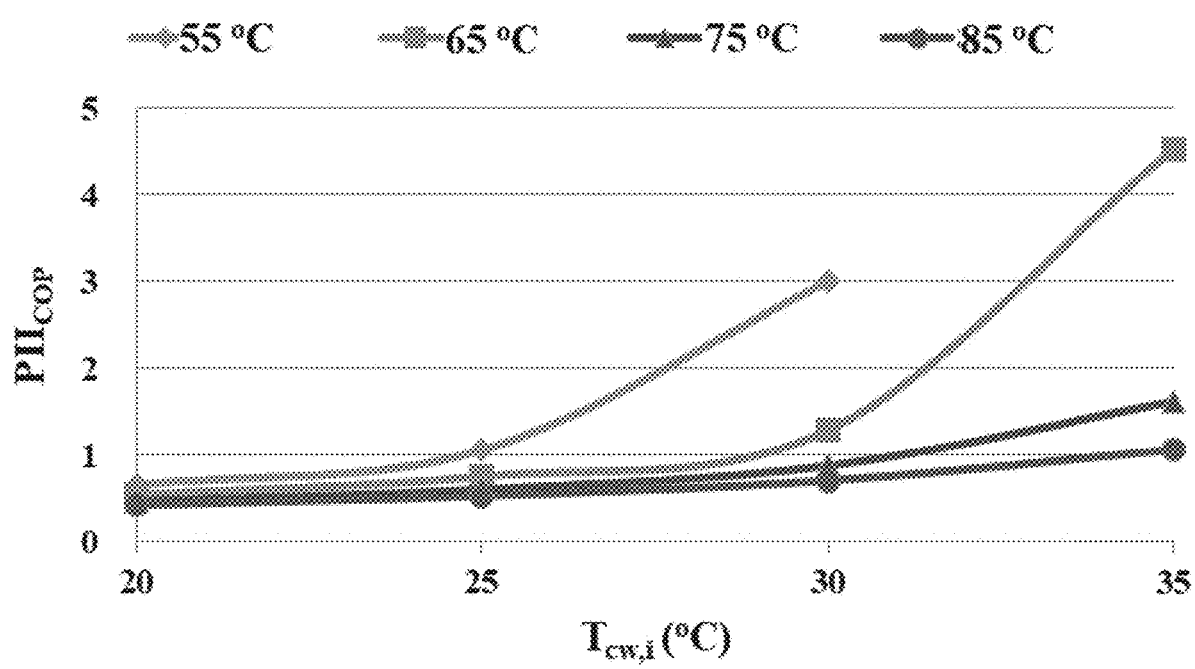
FIG. 6 shows the change in performance improvement index of COP ($PII_{COP}$) with the temperatures of cooling water under different temperatures of hot water supplied to the system according to an embodiment of the present invention.
Figure 7:
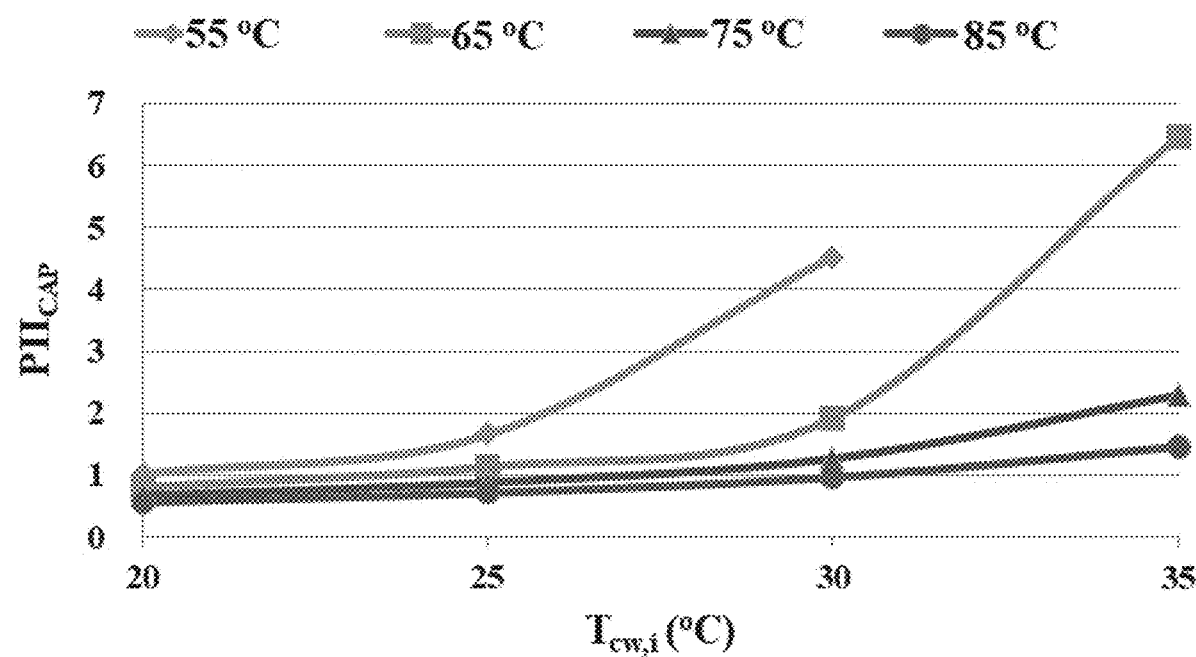
FIG. 7 shows the change in performance improvement index of CAP ($PII_{CAP}$) with the temperatures of cooling water under different temperatures of hot water supplied to the system according to an embodiment of the present invention.

FIGS. 6 and 7 show the changes of $PII_{CAP}$ and $PII_{COP}$ against different temperatures of the cooling water/hot water supplied to the adsorption/desorption chamber of the present invention. The present invention out-performs the AdC more substantially when the cooling water temperature increases and/or the hot water temperature decreases. This characteristic is particularly beneficial when applied to a solar cooling system as the system performance does not reduce much when the solar energy is not sufficient.

Example 4—Variation of COP and CAP with Different Feed Air Temperature

Figure 8:
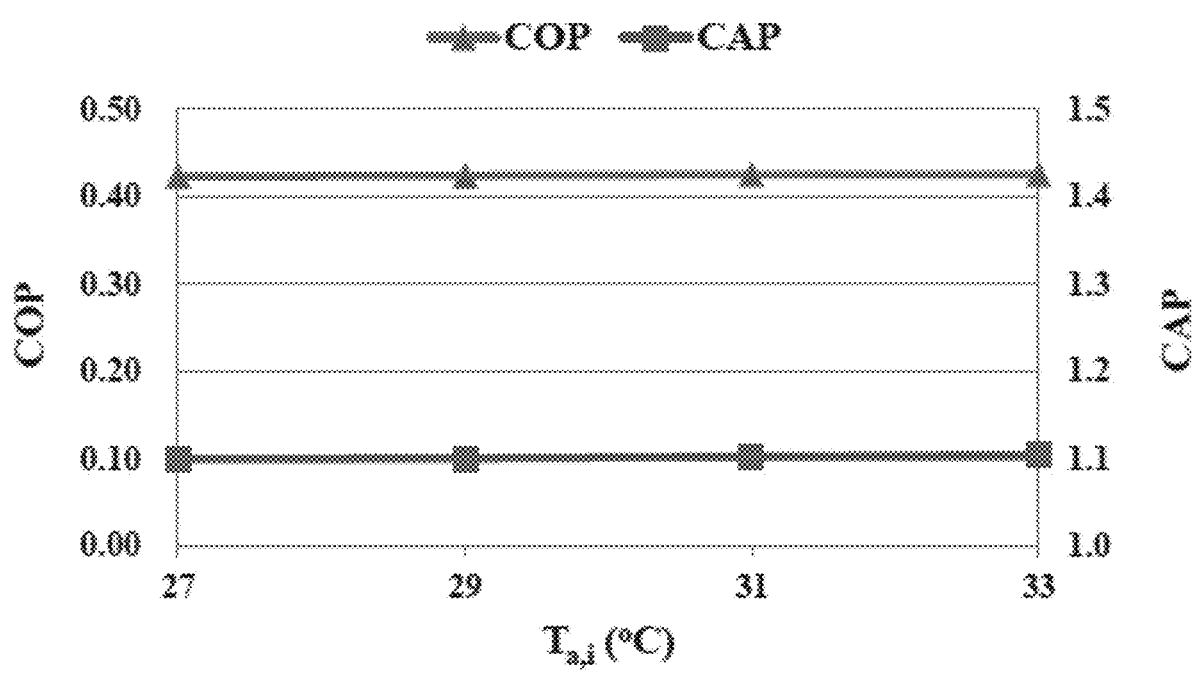
FIG. 8 shows the change in CAP and COP of the present system with different air temperature fed to the feed side of the vapor absorption and adsorption apparatus of the system according to an embodiment of the present invention.

From FIG. 8, it shows that the temperature of air flowing through the feed side of the vapor adsorption apparatus has limited effect on the COP and cooling capacity of the present system, provided that feed rate remains constant (at 0.1 m³/s on an area of about 5 m² in this example). Compared to the conventional use of AdC plus a cooling coil in which the cooling capacity decreases considerably at a lower air temperature, the merit of the present invention over the AdC is apparent.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

INDUSTRIAL APPLICABILITY

The present invention provides an environmental friendly adsorption vacuum dehumidifier which can be applied in a wide range of air-conditioning systems which conventionally requires a more energy-consuming and high-emission mechanism to extract moisture from the fed air into the system where the water absorption/adsorption refrigeration cycle takes place.

REFERENCES

The following references are described herein:
1. Fong, K F, Chow, T T, Lee, C K, Lin, Z, Chan, L S (2010). Comparative study of different solar cooling systems for buildings in subtropical city. Solar Energy 84(2) 227-44.
2. Qu, M, Abdelaziz, O, Gao, Z, Yin, H (2018). Isothermal membrane-based air dehumidification: A comprehensive review. Renewable and Sustainable Energy Reviews 82 4060-9.
3. Rahimi-Ahar, Z, Sadegh Hatamipour, M, Ghalavand, Y, Palizvan, A (2020). Comprehensive study on vacuum humidification-dehumidification (VHDH) desalination. Applied Thermal Engineering 169 Article no. 114944.
4. Scovazzo, P, MacNeill, R (2019). Membrane module design, construction, and testing for vacuum sweep dehumidification (VSD): Part I, prototype development and module design. Journal of Membrane Science 576 96-107.
5. Scovazzo, P, Scovazzo, A J (2013). Isothermal dehumidification or gas drying using vacuum sweep dehumidification. Applied Thermal Engineering 50(1) 225-33.
6. Bukshaisha, A A, Fronk, B M (2019). Simulation of membrane heat pump system performance for space cooling. International Journal of Refrigeration 99 371-81.
7. Bui, D T, Ja, M K, Gordon, J M, Ng, K C, Chua, K J (2017a). A thermodynamic perspective to study energy performance of vacuum-based membrane dehumidification. Energy 132 106-15.
8. Bui, T D, Wong, Y, Islam, M R, Chua, K J (2017b). On the theoretical and experimental energy efficiency analyses of a vacuum-based dehumidification membrane. Journal of Membrane Science 539 76-87.
9. Chan K C, Tso, C Y, Chao, C Y H, Wu, C L (2015). Experiment verified simulation study of the operating sequences on the performance of adsorption cooling system. Building Simulation 8(3) 255-69.

The invention claimed is:

1. A heat-driven adsorption vacuum dehumidification system comprising:
a vapor adsorption apparatus comprising a water permeable hydrophilic membrane separating the apparatus into at least two sections comprising a feed section and an evaporator, the feed section being disposed at where process air flows through the apparatus and has a maximum contact area with a surface of the water permeable hydrophilic membrane;
the evaporator being disposed distal to where the process air flows through the vapor adsorption apparatus and having a lower water vapor pressure than that of the feed section such that a water vapor pressure difference is established across the water permeable hydrophilic membrane;
a two-bed adsorption-desorption section comprising at least an adsorption chamber and a desorption chamber, the adsorption chamber communicating with the evaporator and a cooling source, the desorption chamber communicating with a condenser and a hot source, respectively, the adsorption chamber comprises at least one adsorbent and supplied with a cooling agent from the cooling source to keep the water vapor pressure of the adsorbent below that of the evaporator so that moisture from the process air passing through the water permeable hydrophilic membrane migrates from the evaporator to the adsorption chamber;
the desorption chamber communicating with the condenser and the hot source supplied with the heating agent in order to keep the vapor pressure of the adsorbent in the desorption chamber higher than that of the condenser so that the adsorbed water migrates from the desorption chamber into the condenser;
the condenser communicating with the desorption chamber and the cooling source, respectively, and having been supplied with a cooling liquid to convert the water vapor migrated from the desorption chamber into a condensed water; and
wherein the air after flowing through the vapor adsorption apparatus is dry and the system is free from electricity to establish and maintain the lower pressure in the evaporator.

2. The system of claim 1, further comprising an auxiliary cooling provision through the evaporator and a chilled liquid source by communicating with the condenser.

3. The system of claim 1, wherein the cooling agent source is a cooling water from a cooling water circulation collected from a cooling tower or nearby fresh water source.

4. The system of claim 1, wherein the heating agent comprises hot water being heated up by a renewable source comprising solar energy or waste heat.

5. The system of claim 1, wherein the adsorbent is selected from silica gel, activated carbon, zeolite, or MOF.

6. The system of claim 1, wherein the water permeable hydrophilic membrane is selected from a material with pores that only allow moisture from the process air to pass through along the vapor pressure difference.

7. The system of claim 1, wherein the evaporator of the vapor adsorption apparatus is kept at below 2 kPa.

8. The system of claim 1, wherein the temperature of water supplied to the adsorption chamber is above 60 degrees Celsius.

9. The system of claim 1, wherein the temperature of water supplied to the desorption chamber is below 35 degrees Celsius.

10. A method for using a heat-driven adsorption vacuum dehumidification system to remove moisture from process air, the method comprising:
providing a water vapor pressure difference to extract moisture from the process air passing through a vapor adsorption apparatus incorporated with a water permeable hydrophilic membrane specific for water molecules to pass through from a feed side to an evaporator of the vapor adsorption apparatus in the absence of any electricity;

cooling an adsorption chamber communicating with the evaporator of the vapor adsorption apparatus such that the moisture extracted from the feed side through the water permeable hydrophilic membrane into the evaporator is adsorbed on a surface of an adsorbent having been cooled to below a temperature when the water vapor pressure of the adsorbent is lower than that at the evaporator;

heating a desorption chamber communicating with a condenser to reach a temperature that desorbs the water on the surface of the adsorbent from the desorption chamber or compartment into the condenser;

cooling the condenser communicating with the desorption chamber to a temperature to condense the water vapor migrated from the desorption chamber into the condenser;

wherein the hot source is supplied from a renewable energy source or waste source.

11. The method of claim 10, further comprising providing auxiliary cooling by transferring part of the condensed water from the condenser to the evaporator through an expansion valve to cool a chilled liquid source running through the evaporator.

12. The method of claim 10, wherein the cooling source is a cooling water from a cooling water circulation collected from a cooling tower or nearby fresh water source.

13. The method of claim 10, wherein the renewable source comprises solar energy or waste heat.

14. The method of claim 10, wherein the adsorbent is selected from silica gel, activated carbon, zeolite, or MOF.

15. The method of claim 10, wherein the water permeable hydrophilic membrane is selected from a material with pores that only allow moisture from the process air to pass through along the vapor pressure difference.

16. The method of claim 10, wherein the evaporator of the vapor adsorption apparatus is kept at below 2 kPa.

17. The method of claim 10, wherein the temperature of water supplied to the adsorption chamber or compartment is above 60 degrees Celsius.

18. The method of claim 10, wherein the temperature of water supplied to the desorption chamber or compartment is below 35 degrees Celsius.

* * * * *